United States Patent
Von Ballmoos et al.

(10) Patent No.: US 10,300,824 B2
(45) Date of Patent: May 28, 2019

(54) VEHICLE SEAT WITH AN ADJUSTABLE SEAT BASE AND METHOD FOR ADJUSTING AN ADJUSTABLE SEAT BASE

(71) Applicant: Lantal Textiles AG, Langenthal (CH)

(72) Inventors: Roland Von Ballmoos, Erlenbach (CH); Andreas Guehmann, Pfaffhausen (CH); Oliver Rohrbach, Oensingen (CH)

(73) Assignee: LANTAL TEXTILES AG, Langenthal (CH)

(*) Notice: Subject to any disclaimer, the term of this patent is extended or adjusted under 35 U.S.C. 154(b) by 0 days.

(21) Appl. No.: 15/310,386

(22) PCT Filed: Apr. 28, 2015

(86) PCT No.: PCT/CH2015/000065
§ 371 (c)(1),
(2) Date: Nov. 10, 2016

(87) PCT Pub. No.: WO2015/172258
PCT Pub. Date: Nov. 19, 2015

(65) Prior Publication Data
US 2017/0151895 A1    Jun. 1, 2017

(30) Foreign Application Priority Data
May 14, 2014  (EP) .................................... 14405042

(51) Int. Cl.
*B60N 2/02*      (2006.01)
*B60N 2/18*      (2006.01)
(Continued)

(52) U.S. Cl.
CPC ........... *B60N 2/914* (2018.02); *B60N 2/0284* (2013.01); *B60N 2/62* (2013.01); *B64D 11/0639* (2014.12);
(Continued)

(58) Field of Classification Search
CPC ........ B60N 2/62; B60N 2/0284; B60N 2/914; B60N 2002/0288; B60N 2205/30; B64D 11/0639
(Continued)

(56) References Cited

U.S. PATENT DOCUMENTS 4,629,248 A * 12/1986 Mawbey .................. B60N 2/62
                                                        297/284.11
4,773,703 A    9/1988 Krügener et al.
(Continued)

FOREIGN PATENT DOCUMENTS

DE         36 31 872 C1    10/1987
DE     10 2006 037 521 A1    5/2007
(Continued)

OTHER PUBLICATIONS

Office Action dated Feb. 4, 2019 in corresponding JP Application No. 2017-512076 with an English Translation.

*Primary Examiner* — Rodney B White
(74) *Attorney, Agent, or Firm* — Birch, Stewart, Kolasch & Birch, LLP

(57) ABSTRACT

A vehicle seat having a seating surface which has a front edge and a rear edge, and a backrest arranged at the rear edge and situated at an angle to the seating surface. The seating surface is divided into a main part and at least one front part. The main part and the at least one front part can be moved relative to one another by means of an adjusting device to enable a distance between the front edge and the rear edge of the seating surface to be adjusted dynamically. At least two inflatable chambers are arranged between the main part and the at least one front part, which chambers can be inflated and emptied in accordance with the distance of the front edge from the rear edge.

12 Claims, 3 Drawing Sheets

(51) Int. Cl.
  *B60N 2/90* (2018.01)
  *B64D 11/06* (2006.01)
  *B60N 2/62* (2006.01)

(52) U.S. Cl.
  CPC .. *B60N 2002/0288* (2013.01); *B60N 2205/30* (2013.01)

(58) Field of Classification Search
  USPC .................................................. 297/284.11
  See application file for complete search history.

(56) References Cited

U.S. PATENT DOCUMENTS

| | | | | |
|---|---|---|---|---|
| 5,263,765 | A * | 11/1993 | Nagashima | A47C 7/467 297/284.11 |
| 6,769,146 | B2* | 8/2004 | Copeland | B60N 2/58 297/452.61 |
| 7,726,739 | B2* | 6/2010 | Wain | B60N 2/4415 297/284.11 |
| 8,128,167 | B2* | 3/2012 | Zhong | B60N 2/0284 297/284.11 |
| 9,010,858 | B2* | 4/2015 | Wegelmann | B60N 2/0284 297/284.11 |
| 2002/0021036 | A1* | 2/2002 | Jonas | A47C 1/023 297/284.11 |
| 2005/0184569 | A1* | 8/2005 | Penley | B60N 2/62 297/284.11 |
| 2010/0327648 | A1* | 12/2010 | Livengood | B60N 2/58 297/452.61 |
| 2013/0300171 | A1 | 11/2013 | Wiegelmann et al. | |
| 2014/0167465 | A1* | 6/2014 | Sakata | B60N 2/0284 297/284.11 |
| 2015/0231991 | A1* | 8/2015 | Yetukuri | B60N 2/0284 297/284.11 |
| 2015/0360597 | A1* | 12/2015 | Galbreath | B60N 2/70 297/452.38 |

FOREIGN PATENT DOCUMENTS

| | | |
|---|---|---|
| DE | 10 2009 057 435 A1 | 6/2011 |
| DE | 10 2012 101 433 A1 | 8/2013 |
| DE | 10 2012 009 591 A1 | 11/2013 |
| EP | 1 630 031 A2 | 3/2006 |
| JP | 55-153959 U | 11/1980 |
| JP | 59-73331 A | 4/1984 |
| JP | 61-7345 U | 1/1986 |
| JP | 63-159544 U | 10/1988 |
| JP | 6-284940 A | 10/1994 |
| JP | 2011-505979 A | 3/2011 |
| WO | WO 00/05998 A1 | 2/2000 |
| WO | WO 2004/030496 A1 | 4/2004 |
| WO | WO 2006/060833 A1 | 6/2006 |

* cited by examiner

VEHICLE SEAT WITH AN ADJUSTABLE SEAT BASE AND METHOD FOR ADJUSTING AN ADJUSTABLE SEAT BASE

TECHNICAL FIELD

The invention relates to a vehicle seat in which the distance between a front edge and a rear edge of a seating surface can be changed dynamically.

PRIOR ART

Adjustable seating surfaces, in particular seating surfaces, the length of which can be adjusted dynamically, are known in the vehicle seat sector.

Thus, for example, DE 10 2012 009 591 A1 (GM Global Technology) discloses a vehicle seat on which the extent of the seating surface in the longitudinal direction can be changed at a constant speed of motion by inflating a pneumatic bellows. The seating surface can be divided in the transverse direction of the seat into seat subelements, wherein a pneumatic bellows is arranged in each case between at least two elements. The return motion is accomplished on the basis of an elastic element, in particular a spring. The pneumatic bellows can be divided by partition walls into a plurality of pneumatic subchambers, which are preferably designed to communicate. In order to control the direction of motion, at least one guide element is arranged on the vehicle seat.

WO 06/060833 A1 (Greiner Purtec) describes a seat cushion for a seat, in particular for an aircraft seat. The seat depth can be adapted with the aid of an adjusting element of variable volume. In one embodiment, the adjusting element is designed as a foam element formed in an air chamber.

WO 04/030496 A1 discloses a pneumatically extendable device which can be mounted on a seating surface of a chair. The device comprises a pneumatic hollow body that can be extended in the manner of a harmonica, together with which guide means attached to a front plate can be extended. Spring elements are extended as the pressure in the hollow body increases and pull the hollow body back again when the pressure is relieved.

The disadvantage with the previously known adjustable seating surfaces is that a movement counter to a restoring force is accomplished purely by pneumatic elements, and therefore these elements have a relatively high internal pressure and, as a result, feel unpleasantly hard to a user.

Another known practice is for parts of seating surfaces to be movable in at least one direction by mechanical adjusting devices in order to enlarge dimensions of the seating surface. However, the disadvantage is that gaps are formed by the adjustment of these parts, and these gaps are no longer cushioned. As a result, there may be a loss of seating comfort.

DESCRIPTION OF THE INVENTION

It is the object of the invention to provide a vehicle seat belonging to the technical sector stated at the outset which has a structure which is as simple as possible and allows good longitudinal adjustability combined with a high level of seating comfort.

The way in which the object is achieved is defined by the features of claim 1. According to the invention, a vehicle seat comprises a seating surface, which has a front edge and a rear edge, and a backrest arranged at the rear edge and situated at an angle to the seating surface. The seating surface is divided into a main part and at least one front part. The two parts can be moved relative to one another by means of a mechanical adjusting device to enable a distance between the front edge and the rear edge of the seating surface to be adjusted dynamically. At least two inflatable chambers are arranged between the main part and the front part, which chambers can be inflated and emptied in accordance with the distance of the front edge from the rear edge. Each of the at least two inflatable chambers has a valve and a pressure sensor. The vehicle seat according to the invention furthermore comprises a control unit, which switches the valves in such a way that a predetermined pressure prevails within the inflatable chambers at all times.

By means of the at least two inflatable chambers, it is possible, as the front part is adjusted relative to the main part of the seating surface, for the gap which forms between these parts to be filled, giving a level seating surface for a user situated on the seating surface, irrespective of the distance between the front edge and the rear edge. In the inflated state, the at least two inflatable chambers thus form a part of the seating surface. By virtue of the fact that the same predetermined pressure is always maintained within the inflatable chambers, their hardness always feels the same to a user of the vehicle seat, ensuring a high level of seating comfort.

The predetermined pressure which is to be maintained within the inflatable chambers is preferably fixed in advance, e.g. by the manufacturer of the vehicle seat. In particular, this predetermined pressure is stored in a memory of the control unit. Ideally, the predetermined pressure is chosen so that the hardness of the at least two inflatable chambers feels approximately the same to a user of the vehicle seat as the upholstery of the main part and of the at least one front part.

As an alternative, it is also possible to make provision to enable the predetermined pressure to be changed by the user of the vehicle seat, in particular within a certain pressure range. As a particularly preferred option, the predetermined pressure is 5 kPa (50 mbar).

The angle between the seating surface and the backrest can preferably be changed by means of a further adjusting mechanism, allowing different configurations of the vehicle seat to be achieved. In this sector, a large number of possible adjusting mechanisms for adjusting the angle between a seating surface and a backrest are known to a person skilled in the art.

The mechanical adjusting device preferably comprises an electric motor and a spindle, with the aid of which the front part can be adjusted electrically relative to the main part. This increases the comfort of a user when setting a suitable length of the seating surface. As an alternative, the motion can also be assisted by other suitable means, such as guide elements.

The at least two inflatable chambers are preferably designed as a pneumatic cushions. Depending on the desired maximum length of adjustment, it is also possible for more than two inflatable chambers to be provided, e.g. three, four, five or more inflatable chambers.

In the sense according to the present invention, an "inflatable chamber" is an internal space which is surrounded by a flexible sheet-like material and can be filled with a fluid, in particular a gas, particularly preferably with air. The sheet-like material is preferably shaped in such a way that the inflatable chamber has a predefined shape when it reaches a maximum filling volume. In the case of the inflatable chambers according to the present invention, this predefined shape is preferably a cuboid.

Each inflatable chamber is preferably connected to at least one feed line, via which a fluid can be introduced into the inflatable chamber or released from the chamber. This at least one feed line is preferably connected to at least one valve block, by means of which the at least one feed line can be connected to a pump or a compressed air system. The at least one valve block preferably has a plurality of valves, by means of which a plurality of feed lines can be connected selectively to at least one pump or one compressed air system. The provision of a valve block reduces the complexity of the structure of the vehicle seat. The at least one feed line is preferably connected to the inflatable chamber by means of a flange situated on an outer wall of said chamber. The valves belonging to a vehicle seat are preferably combined in a single valve block. As a result, said valves are located at a central point, significantly simplifying the maintenance and replacement thereof. This furthermore also makes the necessary cabling between the control unit and the valves significantly simpler.

As a particularly preferred option, the at least two inflatable chambers have, in the interior thereof, at least one web, which stabilizes the shape of the sheet-like material surrounding the interior.

As a person skilled in the art will recognize, the present invention can also be implemented with just one or with more than two inflatable chambers between the front part and the main part. An alternative preferred embodiment therefore comprises just one inflatable chamber between the front part and the main part.

The at least two inflatable chambers are preferably connected mechanically to one another by in each case one lateral surface. The lateral surfaces are preferably adhesively bonded to one another. As an alternative, other types of joint are also suitable, e.g. a seam or a hook-and-loop fastener, e.g. a burr fastener. The inflatable chambers, which rest against the main part and against the front part of the seating surface, are preferably connected mechanically thereto, in particular by means of an adhesive joint or by means of a hook-and-loop fastener, in particular a burr fastener. It is thereby possible to create a continuous seating surface that is pleasant for a user of the vehicle seat, i.e. to the user, the inflatable chambers feel as though they form a part of the seating surface.

The at least two inflatable chambers are preferably arranged in series in the direction of motion of the at least one front part. As an alternative, it is also possible for at least one further, rigid intermediate part to be arranged between the at least two inflatable chambers.

The at least two inflatable chambers are preferably inflated or emptied sequentially in the direction of motion of the front part, with the result that one inflatable chamber is fully inflated first of all before another inflatable chamber is inflated. The emptying of the inflatable chambers as the seating surface is reduced in size preferably takes place in the reverse sequence to that for inflation, wherein one inflatable chamber is fully emptied first of all before another inflatable chamber is emptied.

The inflatable chambers preferably all have the same dimensions. As an alternative, however, the inflatable chambers can also have different dimensions.

As an inflatable chamber is emptied, the fluid present in the inflatable chamber is preferably extracted completely, e.g. by a pump. Since, as the distance between the front edge and the rear edge is reduced, the volume available for the at least two inflatable chambers between the front part and the main part becomes smaller, the pressure within the at least two chambers will rise. However, since the control device holds the pressure within the chambers constant, the fluid present in the chambers is emptied by said device. This is accomplished, for example, by pumping it out by means of a pump or by opening an outlet valve, wherein the fluid is forced out of the at least two inflatable chambers by the reduction in volume between the front part and the main part.

In the sense according to the present application, a "vehicle" is taken to mean any means of transport by means of which people can be carried on land, in the air or on water. This includes, in particular, cars, buses, trains, planes, helicopters, boats and ships. The term "vehicle seat" is accordingly taken to mean a seat for use in one of said vehicles.

The control unit is preferably configured in such a way that the inflation and emptying of the individual inflatable chambers takes place in a manner coordinated with the movement of the adjusting device. In the case where there is a spindle driven by an electric motor to move the front part of the seating surface, for example, the inflation and emptying of individual inflatable chambers can be coordinated with the speed of rotation of the spindle or the number of revolutions, with the result that a user sitting on the seating surface feels a substantially uniform seating surface at all times. This allows as comfortable as possible operation of the vehicle seat by a user.

The control unit preferably comprises a microchip, which is driven by an operating unit mounted on the vehicle seat, e.g. in the form of actuable buttons or switches. The control unit acts in a corresponding way on the adjusting device in order to move the front part relative to the main part. For example, a user can select a predetermined configuration of the vehicle seat, such as "normal sitting position", "relax" etc.

The control unit is preferably configured in such a way that the valves of the at least two inflatable chambers are opened in each case when a predetermined distance between the front edge and the rear edge is reached.

This simplifies the configuration of the vehicle seat according to the invention since the control unit merely has to monitor the reaching of specific event locations, namely the predetermined distances between the front edge and the rear edge. Once such a distance has been reached, the valve of the inflatable chamber associated with the distance is opened. Since the control unit adjusts the pressure in the at least two inflatable chambers constantly to the predetermined pressure, the size of the at least two inflatable chambers adapts automatically to the growing distance between the front part and the rear part. This occurs because the enlargement of the distance means that there is a larger volume available to the at least two inflatable chambers between the at least one front part and the main part. However, if the volume of an inflatable chamber increases while the fluid level remains the same, the fluid pressure prevailing within the inflatable chamber decreases. This is registered by the pressure sensor, wherein the control unit switches the associated valve in such a way that fluid flows into the inflatable chamber until the predetermined pressure once again prevails within the inflatable chamber.

The control device is furthermore preferably configured in such a way that these are closed in each case when a predetermined distance is reached as the distance between the front edge and the rear edge is reduced. Since the pressure within the at least two inflatable chambers is held at the predetermined pressure at all times, the control device switches the valves of the at least two inflatable chambers in such a way that fluid is forced out of said chambers as the distance between the front edge and the rear edge decreases.

The at least two inflatable chambers preferably have an outer wall with predetermined folding locations produced in advance. As a result, ordered folding is made possible as the inflatable chambers are emptied, ensuring that the emptied inflatable chamber takes up as little space as possible. It is furthermore also thereby possible to prevent the formation of folds that are unpleasant to the user on the seating surface owing to disordered folding of the emptied chambers.

The vehicle seat preferably comprises at least one pump, which is connected fluidically to at least one of the inflatable chambers. This enables the inflatable chambers to be pumped up as simply and quickly as possible.

As a particularly preferred option, each of the at least two inflatable chambers is connected to the pump by a dedicated feed line. Moreover, the pump can be configured in such a way that it can compress the fluid only to a predetermined pressure. This ensures that it is never possible for a pressure higher than the predetermined pressure to prevail within the at least two inflatable chambers.

The at least one pump is preferably configured in such a way that it is designed both to pump up and also actively to empty, i.e. extract the fluid in the inflatable chambers.

A textile cover is preferably arranged over the main part, the front part and the at least two inflatable chambers, which cover is held under tension by means of a tensioning device arranged underneath the seating surface, in particular in the form of a tension spring. This results in an upper surface of the seating surface which is optically appealing, pleasant to touch and uniform for a user. The tensioning device ensures that the textile cover is under tension at any set distance between the front edge and the rear edge and that no troublesome folds form. As an alternative, the textile cover can also be composed of a stretch fabric, which adapts automatically to the different distances.

The at least two inflatable chambers are preferably covered with a fire-retardant fabric. This enables the vehicle seat according to the invention to comply with the prescribed safety standards in vehicle construction, especially those for aircraft.

As a particularly preferred option, the vehicle seat comprises two front parts and a main part, wherein at least two inflatable chambers are arranged between in each case one of the two front parts and the main part.

It is thereby possible to configure a vehicle seat according to the invention with individually adjustable leg rests. This is advantageous particularly when a seat according to the invention is used as a driver's or pilot's seat since the user can set the leg rests individually in such a way that pedals on the floor can be reached comfortably.

As a particularly preferred option, the vehicle seat is an aircraft seat. Owing to the particularly simple and weight saving design, a vehicle seat according to the invention has advantageous characteristics for aircraft interior equipment.

Further advantageous embodiments and combinations of features of the invention will become apparent from the following detailed description and from the patent claims as a whole.

The present application furthermore relates to a method for adjusting at least one front part of a split seating surface of a vehicle seat relative to a main part. The method according to the invention is preferably carried out with a vehicle seat described above.

In a first step of the method, the at least one front part is moved relative to the main part by means of a mechanical adjusting device. In another step, at least one of at least two inflatable chambers that are arranged between the at least one front part and the main part are inflated with a fluid in accordance with the distance between the front edge and the rear edge. Inflation is preferably performed by a pump. The pressure within the at least two inflatable chambers is measured in each case by a pressure sensor, wherein a control device switches valves associated with the at least two inflatable chambers in such a way that a predetermined pressure prevails at all times within the at least two inflatable chambers.

BRIEF DESCRIPTION OF THE DRAWINGS

The drawings used to explain the illustrative embodiment show the following.

Fundamentally, identical parts are provided with identical reference signs in the figures.

EMBODIMENTS OF THE INVENTION

Figure 1:
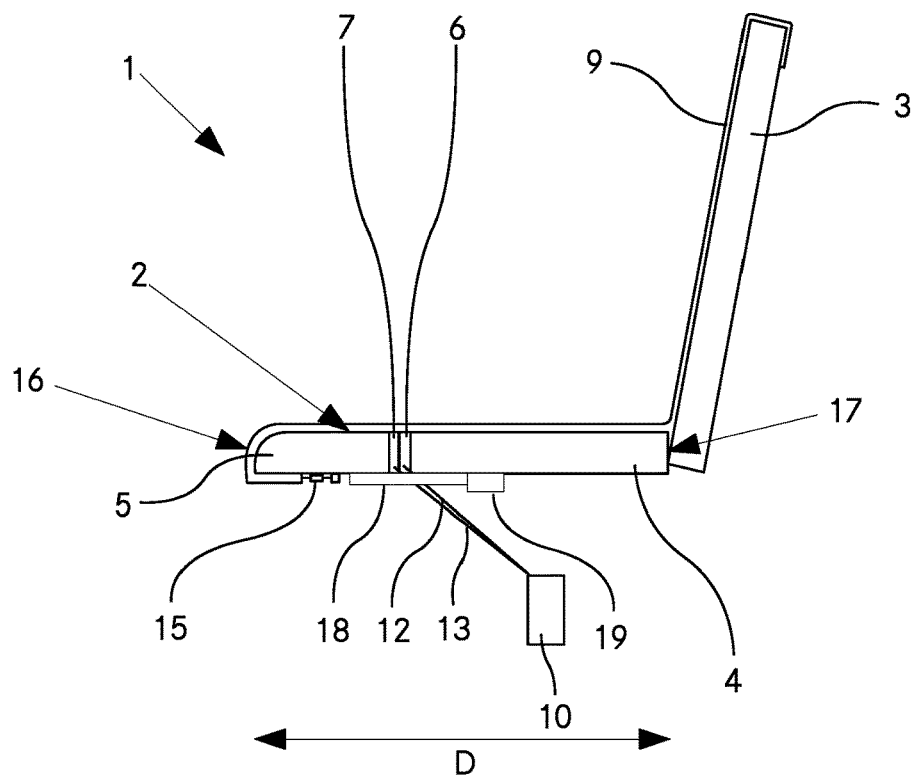
FIG. 1 a schematic side view of a first embodiment of a vehicle seat according to the invention.

FIG. 1 shows a schematic side view of a first embodiment of the vehicle seat 1 according to the invention. To simplify the illustration, no substructure of the vehicle seat 1 is shown.

The vehicle seat 1 comprises a seating surface 2 and a backrest 3. The backrest 3 is arranged at a rear edge 17 of the seating surface 2 and is at an angle relative to the seating surface 2. The angle between the backrest 3 and the seating surface 2 can preferably be changed by means of a mechanism (not shown).

The seating surface 2 has a main part 4 and a front part 5. The front part 5 comprises a front edge 16 of the seating surface 2, which is of rounded configuration in the embodiment shown in order to improve the comfort of a user of the vehicle seat 1. Two inflatable chambers 6, 7 are arranged between the main part 4 and the front part 5. In FIG. 1, both inflatable chambers 6, 7 are shown in the empty state. The seating surface 2 has the minimum possible distance D between the front edge 16 and the rear edge 17. Each inflatable chamber 6, 7 is connected by a feed line 12, 13 to a pump 10.

A textile cover 9 is arranged over the seating surface and over the backrest 3. The textile cover 9 is connected on the underside of the front part 5 of the seating surface 2 to a tensioning device 15, which tensions the textile cover 9 over the seating surface 2 at any distance between the front edge 16 and the rear edge 17. The tensioning device 15 can be designed as a tension spring, for example. In addition, the textile cover 9 is secured on the rear side of the backrest 3. Depending on the configuration of the vehicle seat, the textile cover 9 can be secured at additional points to the seating surface 2 and/or the backrest 3.

The vehicle seat according to the invention furthermore has a mechanical adjusting device, by means of which the distance between the front edge 16 and the rear edge 17 can be changed. The mechanical adjusting device comprises a spindle 18 and a spindle drive 19. Through rotation of the spindle 18 by means of the spindle drive 19, the distance D between the front edge 16 and the rear edge 17 can be changed.

Figure 2:
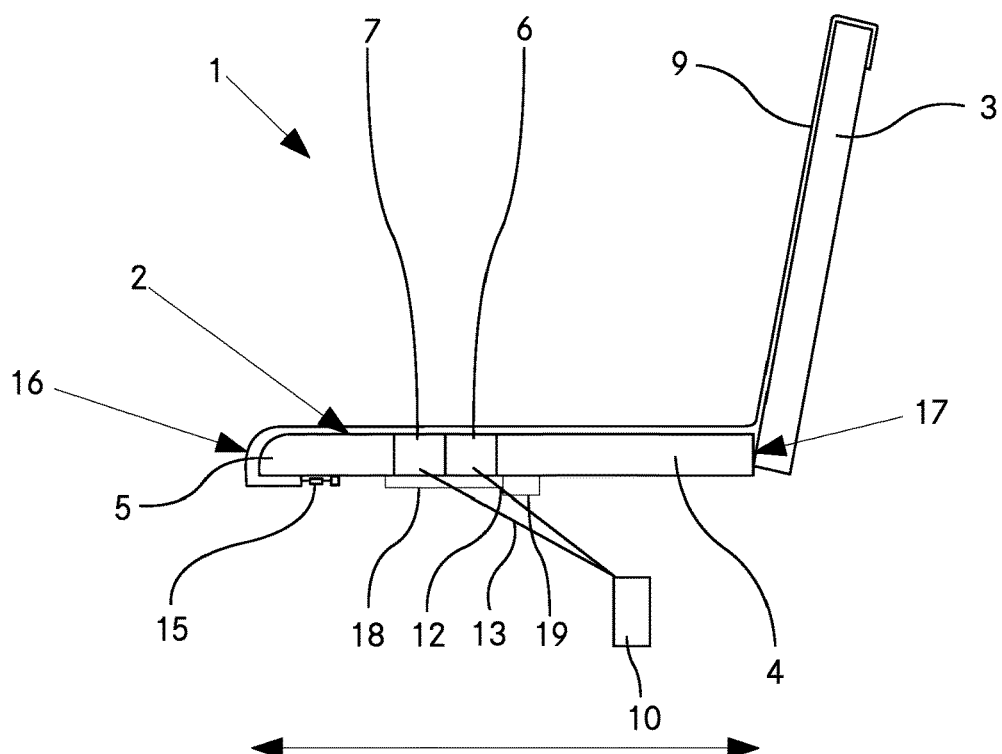
FIG. 2 a schematic side view of the vehicle seat from FIG. 1 with inflated inflatable chambers.

FIG. 2 shows the vehicle seat from FIG. 1 in a schematic side view, wherein the distance D between the front edge 16 and the rear edge 17 of the seating surface 2 has been increased by rotating the spindle 18, i.e. the seating surface 2 has been extended relative to the illustration in FIG. 1.

The first inflatable chamber 6 and the second inflatable chamber 7 are shown in the fully inflated state. The two inflatable chambers 6, 7 have been inflated selectively in accordance with the distance between the front edge 16 and the rear edge 17. Inflation is preferably controlled by means of a control unit (not shown). Through the selective inflation of the two inflatable chambers 6, 7, a gap which arises between the main part 4 and the front part 5 can be filled, ensuring that there is a continuous seating surface 2 for a user. In this arrangement, the control unit is configured in such a way that a constant predetermined pressure is maintained within the inflatable chambers 6, 7. This is preferably achieved by appropriate control of valves (not shown). The control unit is furthermore configured in such a way that individual inflatable air chambers 6, 7 are inflated by the pump when predetermined distances between the front edge 16 and the rear edge 17 are reached. This is achieved, for example, by opening a corresponding valve, thus allowing the pump 10 to inflate the corresponding inflatable chamber 6, 7 with the fluid. By virtue of the fact that the pressure within the inflatable air chambers 6, 7 is held constant, these adapt to the currently prevailing distance between the front edge 16 and the rear edge 17 and they feel equally hard at all times to a user sitting on the vehicle seat 1.

Figure 3A:
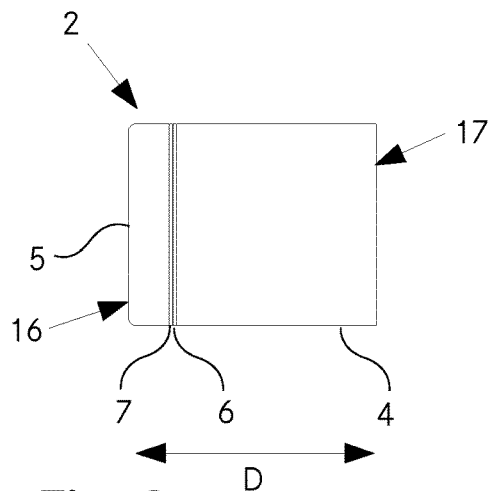
FIGS. 3a, 3b plan views of a seating surface of a vehicle seat according to the present invention.
Figure 3B:
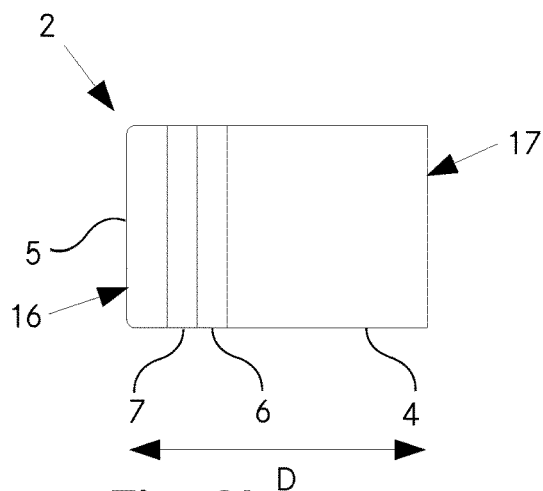

FIGS. 3*a*, 3*b* show a plan view of a seating surface 2 of a vehicle seat 1 according to the invention with different distances D between the front edge 16 and the rear edge 17. FIG. 3*a* illustrates a seating surface 2 with a minimum distance D, wherein the inflatable chambers 6, 7 have been completely emptied. FIG. 3*b* shows the seating surface 2 with a maximum distance D between the front edge 16 and the rear edge 17, wherein the inflatable chambers 6, 7 have been completely inflated. The enlargement of the distance D between the front edge 16 and the rear edge 17 is readily visible.

Figure 4A:
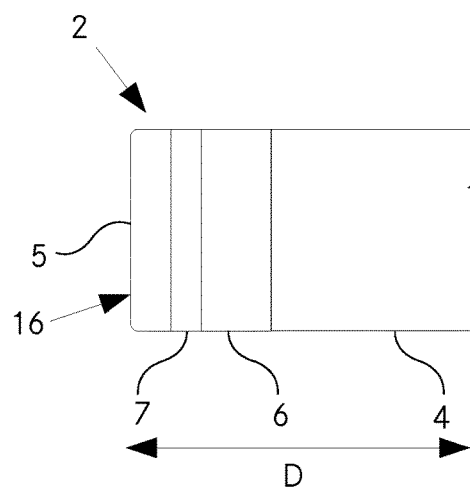
FIGS. 4a-4c plan views of a seating surface of a second embodiment of a vehicle seat according to the invention.
Figure 4B:
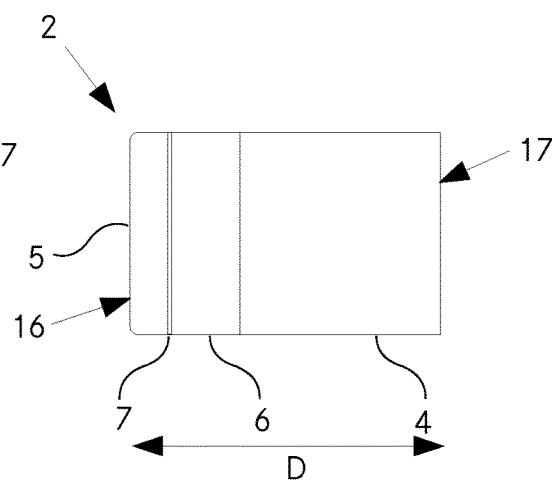
Figure 4C:
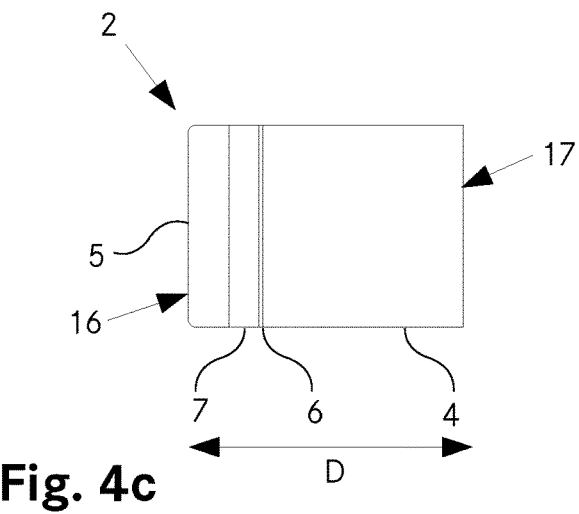

FIGS. 4*a* to 4*c* show a seating surface 2 of a second embodiment of a vehicle seat 1 according to the invention. In this embodiment, the two inflatable chambers 6, 7 are of different sizes. By selectively inflating the first inflatable chamber 6 and/or the second inflatable chamber 7, it is thus possible to bridge different gaps between the main part 4 and the front part 5 of the seating surface 2, said gaps arising from different settings of the distance D between the front edge 16 and the rear edge 17. A person skilled in the art will recognize that not only variation of the size of the inflatable chambers 6, 7 but also variation of the number thereof is possible.

FIG. 4*a* illustrates the seating surface 2 with fully inflated inflatable chambers 6, 7, while FIG. 4*b* shows the seating surface 2 with only the first inflatable chamber 6 inflated. FIG. 4*c* shows the seating surface 2 with only the second chamber 7 fully inflated.

Figure 5A:
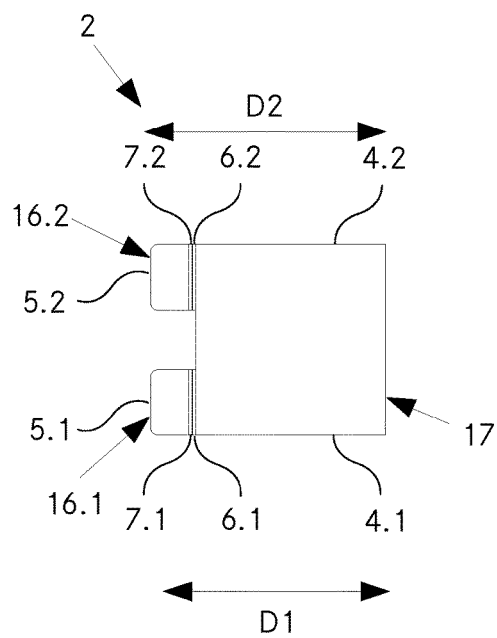
FIGS. 5a, 5b plan views of a seating surface of another embodiment having two front parts.
Figure 5B:
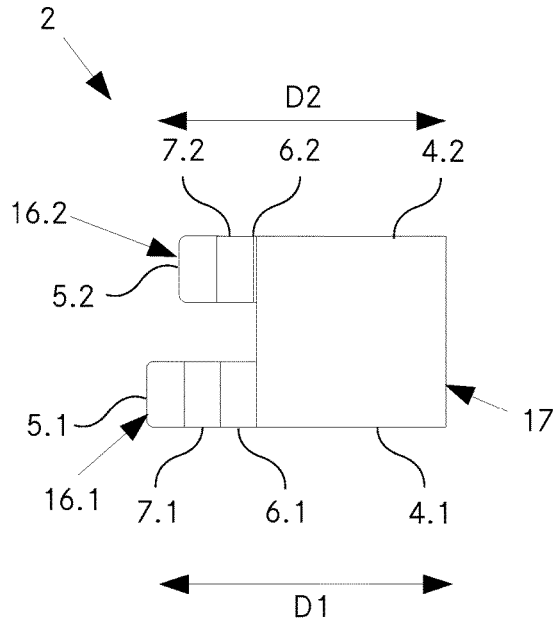

FIGS. 5*a* and 5*b* show plan views of the seating surface 2 of another embodiment of a vehicle seat 1 according to the invention. In this embodiment, the seating surface 2 has a main part 4 and two front parts 5.1, 5.2. Two inflatable chambers 6.1, 6.2, 7.1, 7.2 are arranged in each case between the main part 4 and the two front parts 5.1, 5.2. Accordingly, the vehicle seat 1 has two adjusting devices, by means of which the two distances D1 and D2 can be set individually. In this embodiment of the vehicle seat 1 according to the invention, the two front parts 5.1, 5.2 can be used as adjustable leg rests. As FIG. 5*b* shows, different distances D1, D2 between the respective front edges 16.1, 16.2 and the rear edge 17 of the seating surface 2 can be set for each front part.

The invention claimed is:

1. Vehicle seat comprising a seating surface, which has a front edge and a rear edge, and a backrest arranged at the rear edge and situated at an angle to the seating surface, wherein the seating surface is divided into a main part and at least one front part, which can be moved relative to one another by means of a mechanical adjusting device to enable a distance between the front edge and the rear edge to be adjusted dynamically, wherein at least two inflatable chambers are arranged between the main part and the at least one front part, which chambers can be inflated and emptied in accordance with the distance of the front edge from the rear edge, wherein each of the at least two inflatable chambers has a valve and a pressure sensor, and the vehicle seat has a control unit, which switches the valves in such a way that a predetermined pressure prevails within the inflatable chambers.

2. Vehicle seat according to claim 1, wherein the control unit is configured in such a way that the inflation and emptying of the at least two inflatable chambers takes place in a manner coordinated with the movement of the mechanical adjusting device.

3. Vehicle seat according to claim 1, wherein the control unit is configured in such a way that the valves of the at least two inflatable chambers are opened as the distance between the front edge and the rear edge is enlarged in each case when a predetermined distance is reached.

4. Vehicle seat according to claim 1, wherein the at least two inflatable chambers have an outer wall with predetermined folding locations produced in advance.

5. Vehicle seat according to claim 1, wherein the vehicle seat comprises at least one pump, which is connected fluidly to the at least two inflatable chambers.

6. Vehicle seat according to claim 5, wherein the pump is configured in such a way that it can both pump up and empty the at least two inflatable chambers.

7. Vehicle seat according to claim 1, wherein a textile cover is arranged over the main part, the at least one front part and the at least two inflatable chambers, which cover is held under tension by means of a tensioning device arranged underneath the seating surface.

8. Vehicle seat according to claim 7, wherein the tensioning device is a tension spring.

9. Vehicle seat according to claim 1, wherein the at least two inflatable chambers are covered with a fire-retardant fabric.

10. Vehicle seat according to claim 1, wherein the vehicle seat comprises two front parts and a main part, wherein at least two inflatable chambers are arranged between in each case one of the two front parts and the main part.

11. Vehicle seat according to claim 1, wherein the vehicle seat is an aircraft seat.

12. Method for adjusting at least one front part of a split seating surface of a vehicle seat relative to a main part of the seating surface, comprising the following steps:
   a) moving the at least one front part relative to the main part by means of a mechanical adjusting device;
   b) using a fluid to inflate at least one of at least two chambers that can be inflated between the at least one front part and the main part, in particular by means of a pump, in accordance with the distance of the front edge from the rear edge;

c) characterized in that the pressure within the at least two inflatable chambers is in each case measured by a pressure sensor, and a control device sets valves associated with the inflatable chambers in such a way that a predetermined pressure prevails at all times within the at least two inflatable chambers.

* * * * *